United States Patent [19]

Ito

[11] Patent Number: 5,972,509
[45] Date of Patent: Oct. 26, 1999

[54] MATERIAL FOR TREATING ANIMAL WASTES COMPRISING PAPER POWDER AND METHOD FOR PRODUCING THE MATERIAL

[75] Inventor: Hiroshi Ito, Tokyo, Japan

[73] Assignee: Kabushikikaisha Daiki, Japan

[21] Appl. No.: 08/930,506

[22] PCT Filed: Jan. 29, 1997

[86] PCT No.: PCT/JP97/00201

§ 371 Date: Nov. 20, 1997

§ 102(e) Date: Nov. 20, 1997

[87] PCT Pub. No.: WO97/27739

PCT Pub. Date: Aug. 7, 1997

[30] Foreign Application Priority Data

Jan. 29, 1996 [JP] Japan .................................. 8-046552

[51] Int. Cl.$^6$ .............................. B32B 5/16; A01K 29/00; B02C 17/00; B05D 5/00
[52] U.S. Cl. .................... 428/403; 119/172; 241/24.1; 241/24.28; 241/24.29; 427/220; 427/221; 427/222; 428/407; 428/903.3
[58] Field of Search ..................... 428/403, 407, 428/903.3; 119/171, 172; 34/384, 386, 387; 241/24.1, 24.28, 24.29; 427/220, 221, 222

[56] References Cited

U.S. PATENT DOCUMENTS

| | | | |
|---|---|---|---|
| 4,676,196 | 6/1987 | Lojek et al. | 119/1 |
| 4,721,059 | 1/1988 | Lowe et al. | 119/1 |
| 5,352,780 | 10/1994 | Webb et al. | 536/56 |
| 5,503,111 | 4/1996 | Hughes | 119/173 |
| 5,577,463 | 11/1996 | Elazier-Davis et al. | 119/173 |
| 5,605,114 | 2/1997 | Peltenburg et al. | 119/171 |
| 5,806,462 | 9/1998 | Parr | 119/173 |
| 5,826,543 | 10/1998 | Raymond et al. | 119/173 |
| 5,888,345 | 3/1999 | Knapick et al. | 162/109 |

FOREIGN PATENT DOCUMENTS

| | | |
|---|---|---|
| 62-239932 | 10/1987 | Japan . |
| 1191626 | 8/1989 | Japan . |
| 292223 | 4/1990 | Japan . |
| 2308736 | 12/1990 | Japan . |

*Primary Examiner*—Hoa T. Le
*Attorney, Agent, or Firm*—Ostrolenk, Faber, Gerb & Soffen, LLP

[57] ABSTRACT

A process for producing an animal excretion treating article by classifying a pulverized paper diaper having a particle size of 4 mm or less to separate a paper powder and a highly water-absorptive resin from a plastic material. The plastic material from which the separation of the paper powder and the highly water-absorptive resin have been separated, is pulverized into a particle size of 4 mm or less and extruded and granulated to form a granulate having a grain size of 6 mm or more. The granulate is covered with a paper powder/water-absorptive resin mixture powder resulting from the pulverization of the separated paper powder and water-absorptive resin into a particle size of 1 mm or less. All of the starting materials can be obtained from a paper diaper waste powder, and thus, it is possible to provide, at an inexpensive cost, a granular animal excretion treating article capable of being incinerated even after being used, and a process for producing the same.

19 Claims, 2 Drawing Sheets

MATERIAL FOR TREATING ANIMAL WASTES COMPRISING PAPER POWDER AND METHOD FOR PRODUCING THE MATERIAL

TECHNICAL FIELD

The present invention relates to a process for producing an animal excretion (animal waste matter excreted) treating article made using a paper diaper waste as a starting material, and particularly, to a process for producing an animal excretion treating article which is made using as a starting material, paper diaper and menstrual napkin wastes as defective articles produced in a coarse of production of a paper diaper and a menstrual napkin, which has a water retention function and an insecticidal function, and which can be incinerated or burnt up in a water-containing state after being used.

BACKGROUND ART

Depending upon the type of a product, the paper diaper generally comprises 40 to 50% by weight of cotton-like pulp such as a pulverized pulp, an absorbing sheet of paper and the like, 20 to 30% by weight of a high-molecular absorber such as a highly water-absorptive resin, 10 to 15% by weight of a surface material formed of a non-woven fabric such as a face polyethylene, polyethylene terephthalate, rayon MIX and PETMIX, etc., 10 to 15% by weight of a water-proof material of a polyethylene film, a calcium carbonate-incorporated polyethylene film, etc., and 5% by weight of a tape, such as a furnishing tape, a release tape, a target tape, an elastic yarn such as spandex, or tape of adhesive, an elastic yarn such as spandex, or an adhesive such as hot melt and the like.

For example, the paper diaper is formed by placing an absorbing band containing a mixture of a fuzz, i.e., a fluff made of a pulverized pulp and a highly water-absorptive resin packed in a tissue, onto a polyethylene film at a predetermined place, and sealing an upper surface of such package, for example, by putting a non-woven fabric of polyethylene thereover. A rubber is attached around the waist or leg of the resulting matter, and tape fasteners are mounted on opposite sides of the back of the rubber-attached matter. Tensioning support tapes are mounted in correspondence to the respective tape fasteners.

The disposal paper diaper having such a structure is checked by a cross-over cut check, an absorber position check, a tape position check, a metal detection check and the like, thereby rejecting the defective articles, but the amount of such wastes is increased to very large amount.

However, the paper diaper waste includes, for example, the polyethylene film, the non-woven fabric of polypropylene and the rubber in amounts of about 30% by weight; the highly water absorptive resin in an amount of about 25% by weight; and the pulp powder and the tissue in an amount of about 50% by weight. Therefore, if the paper diaper waste remains as it is, such waste does not find an application, and must be subjected to a classification, thereby separating the polypropylene, the polyethylene, the tissue and the rubber from the highly water-absorptive resin and the pulp. For this reason, most of the paper diaper wastes is incinerated or burnt up.

However, the paper diaper waste has a calorific value as high as 5,000 to 6,000 kcal/kg and hence, must be separated from the common refuses. In addition, even when the paper diaper wastes are burnt up, they must be burnt up in mixture with other refuses, which arises a problem.

It is an object of the present invention to solve the problems concerning the discarding disposal of the paper diaper wastes.

DISCLOSURE OF THE INVENTION

The present inventors have found that if the polyethylene film, the non-woven fabric of polypropylene and the rubber are pulverized into a particle size of 4 mm, particularly, 2 mm or less, the powder resulting from the pulverization has an enhanced water-absorptivity and an enhanced water retention, and that if the paper diaper waste is used as a starting material for the animal excretion treating article, the excreted urine is retained by the water-absorptive resin contained in the paper diaper waste to provide a lowered calorific value and hence, the used animal excretion treating article is a waste suitable for incinerating treatment. Thus, the present inventors have reached the accomplishment of the present invention.

It is an object of the present invention to provide an animal excretion treating article which is produced by effectively utilizing a paper diaper waste having a high calorific value, and which is capable of being incinerated or burnt up even in a water-containing state after being used.

The present invention provides an animal excretion treating article comprising a core section formed of a granulate, and a covering layer section which covers the core section, wherein a main component of the core section is a plastic waste power having a particle size of 4 mm or less, and a main component of the covering layer section surrounding the core section is a paper powder and a water-absorptive resin. In this way, the paper diaper waste having the high calorific value is effectively utilized for the granular animal excretion treating article which is capable of being burnt up. The present invention also provide a process for producing an animal excretion treating article, comprising the steps of classifying a pulverized paper diaper waste into a portion having higher contents of a paper powder and a highly water-absorptive resin and a portion having a higher content of a plastic material; pulverizing the separated portion having the higher content of a plastic material into a particle size of 4 mm; extruding and granulating the material resulting from the pulverization to form a granulate having a particle size of 3 mm or more; and covering the granulate with the portion having the higher content of the paper powder and/or the water-absorptive resin. In this way, the paper diaper waste is effectively utilized for the granular animal excretion treating article which is capable of being incinerated or burnt up.

BRIEF DESCRIPTION OF THE DRAWINGS

Examples of embodiments of the present invention will now be described with reference to FIGS. 1 and 2, and the present invention is not limited in any way to the following description and illustration with reference to FIGS. 1 and 2.

BEST MODE FOR CARRYING THE PRESENT INVENTION

Figure 1:
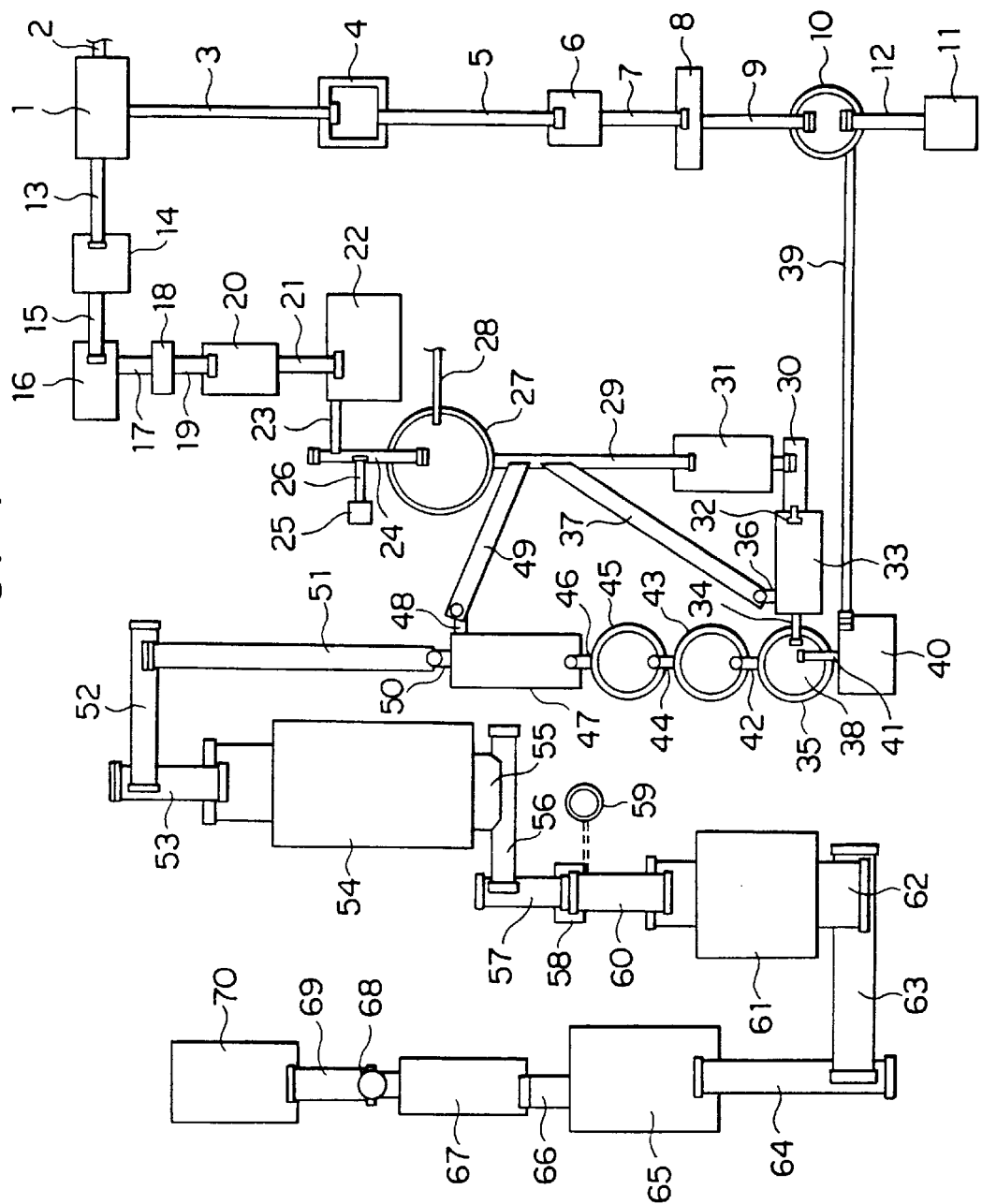
FIG. 1 is a schematic illustration showing steps of production of an animal excretion treating article according to an embodiment of the present invention.

In the description in the specification and claims, i.e., in the present invention, the term "paper diaper" means not only a paper diaper, a menstrual napkin, an incontinence pad and a breast pad, but also wastes of defective paper diaper, menstrual napkin, incontinence pad and breast pad produced in the course of production of them. Among them, particularly, the defective products of paper diaper, menstrual napkin, incontinence pad and breast pad, as well as wastes of defective paper diaper, menstrual napkin, incontinence pad and breast pad produced in the course of the production of them, are referred to as the paper diaper wastes.

In the description in the specification and claims, i.e., in the present invention, the term "plastic waste" means not only a plastic material and a rubber material which are common products, but also the wastes of plastic material waste and/or rubber material produced in the course of the production of a plastic and rubber material products, and plastic and/or rubber material products used or discarded. Among them, particularly, wastes of plastic materials removed from defective products of a paper diaper, a menstrual napkin, an incontinence pad and a breast pad, as well as defuses and wastes of defective paper diaper, menstrual napkin, incontinence pad and breast pad produced in the course of production of them, are referred to as plastic wastes.

In the present invention, the animal excretion treating article is formed as a granular material of the granular core section and the covering layer section covering the granular core section. In the present invention, among fractions resulting from the classification, a fraction (which is called a larger-specific gravity fraction) having a larger specific gravity and resulting from the separation of portions of the paper power and the water-absorptive resin forms the granular core section, and a fraction (which is called a smaller-specific gravity fraction) having a smaller specific gravity and mainly containing the paper power and the highly water-absorptive resin forms the covering layer section. Thus, the paper diaper and particular the paper diaper waste can be effectively used for the animal excretion treating article. Moreover, the animal excretion treating article produced in the above manner is capable of absorbing 18 g of pseudo urine per 10 g of the treating article, i.e., has a high water absorbing rate of 1.8 or more. Even in such a state of the animal excretion treating article after being used, the calorific value can be maintained at 800 kcal/kg or more, preferably, at 1,000 to 2,500 kcal/kg, further preferably, 1,200 to 2,500 kcal/kg, and can be burnt up together with common refuses.

In the present invention, one or more types of paper diapers are used. The waste of a paper diaper containing a plastic material having a calorific value of 5,500 kcal/kg or more such as a polyurethane, a polyethylene, a polypropylene and a polyester is used as such a paper diaper.

Among the fractions of such a paper diaper, particularly, the fraction having a larger particle size is mainly a plastic material and a plastic material containing a rubber material or the like. However, by pulverizing such fraction into a particle size of 2.0 mm or less, the water-absorbing speed and the water retention capability of the produced animal excretion treating article can be remarkably enhanced. Moreover, if the fraction having the larger particle size, i.e., the fraction containing the plastic material is finely pulverized into 2.0 mm or less, particularly, 1.0 mm or less, the granulate resulting from the granulation is colored into gray, which is not preferred for the animal excretion treating article. According to the present invention, however, an animal excretion treating article can be produced by using the larger specific gravity fraction as a material for the granular core section, and pulverizing the smaller specific gravity fraction which is white in color even if it is finely pulverized, into a particle size of 0.2 mm or less, and covering the granular core section with the pulverized smaller specific gravity fraction material to hide the colored portion.

In the present invention, the paper diaper water powder to be classified is a coarsely pulverized product of the paper diaper waste, e.g., in a coarsely cut state, and after being once classified, is pulverized into a particle size of 4 mm or less. When the paper diaper waste powder classified in this manner is pulverized into a particle size of 4 mm or less, the particle size of plastic and tape portions is as relatively course as 4 mm or less, mainly, 2 mm or less, but other portions of the paper diaper waste, i.e., the paper powder and the water-absorptive resin are more fine and have a particle size of 1 mm or less.

In the present invention, when the paper diaper waste is classified and used as the starting material for the animal excretion treating article, most portions of the paper powder and the water-absorptive resin contained in the paper diaper waste are used for the covering layer section, and the portions formed of the remaining plastic and rubber materials are used for the granular core section. The water-absorptive resin enhances the water absorbing performance and hence, the water absorbing performance of the produced animal excretion treating article can be enhanced by the containment of the water-absorptive resin in the animal excretion treating article. In the animal excretion treating article according to the present invention, however, the water retaining performance can be sufficiently maintained by the plastic water powder forming the core section and hence, it is not required that particularly, a highly water-absorptive resin is present in the granular core section.

In the present invention, the smaller-particle size fraction containing the paper powder and the water-absorptive resin is used for the covering layer section. If the paper powder and the water-absorptive resin are used for the covering layer section, the water absorbing performance can be enhanced, and the function of adhering of granules of the animal excretion treating article is increased. Therefore, the use of the paper powder and the water-absorptive resin for the covering layer section is preferred. Particularly, the presence of the water-absorptive resin in the covering layer section is convenient for removing the used portion, because the portions wetted after the use of the treating article are adhered together to form a single mass.

In the present invention, a small amount of the water-absorptive resin is present in the granular core section, but the presence of the water-absorptive resin in the granular core section is preferred, because the water-absorptive resin functions as a lubricant during extrusion and granulation. However, the lubricating effect between the granules during extrusion and granulation is accomplished by water added during granulation and hence, it is preferable that the highly water-absorptive resin is used for the covering layer section.

In the present invention, the paper powder is one used for a paper diaper such as a fluff and a paper powder made of a cotton-like pulp or a pulverized pulp, and the paper powder can be easily separated, for example, from the plastic material by classifying the paper diaper in wet and dry manners.

The water-absorptive resin present in the paper diaper can be separated in the wet and dry manners after the classification. If the water-absorptive resin is separated in the wet manner, it is swelled and hence, can be easily separated.

When the paper diaper waste after removal of the water-absorptive resin is separated in the wet manner, the larger specific gravity fraction can be extruded and granulated in its wetted state. On the other hand, the smaller specific gravity fraction can be mixed with the water-absorptive resin separated after drying and before classification and scattered to the granulate which is in a wetted state.

In the animal excretion treating article according to the present invention, the calorific value is lowered after treating article is used, because a urine excreted is maintained in the treating article. However, the calorific value suitable for incineration can be maintained by the calorific value of the plastic material having the high calorific value and contained in the paper diaper.

In the present invention, the water-absorptive resin includes a highly water-absorptive resin used in a paper diaper, and a so-called lowly water-absorptive resin which is defective as a highly water-absorptive resin. Any of the highly water-absorptive resin and the lowly water-absorptive resin may be used.

In the present invention, in order to increase the calorific value of the animal excretion treating article after being used to 1,000 to 2,500 kcal/kg, and to maintain the water retaining performance in the animal excretion treating article, it is preferable that the content of the plastic material such as the plastic material and the rubber material in the granular core section is increased. In this case, it is preferable that the content of the plastic material classified from the paper diaper waste powder is increased to a high level of 50% by weight ore more, e.g., 70% by weight or more or 90% by weight or more. In order to increase the content of the plastic material in the granular core section in this way, a plastic material having a relatively high calorific value, e.g., a plastic material of 3,000 kcal/kg or more, particularly, a plastic waste can be added. In order to the increase the content of the plastic material in the fraction classified from the paper diaper waste powder, the plastic material can be classified after the water-absorptive resin or the paper powder and the water-absorptive resin are previously removed. In this case, the separated extra paper powder and water-absorptive resin can be used for another application.

In the present invention, wood pieces of a hiba arborvitae or a sun tree can provide the animal excretion treating article with a deodorizing function, insecticidal function and a perfuming function, and hence, may be added in an amount of 5% by weight of the granular core section.

In the present invention, a substance having a germicidal action may be added to the granular core section, or the covering layer section, or the granular core section and the covering layer section of the animal excretion treating article, in order to avoid the generation of fungi. Examples of such substance having the germicidal action are a germicide, an antiseptic agent and a fungicide such as table salt, sorbic acid or the salt thereof, calcium propionate, sodium hypochlorite, and/or benzoic acid or the salt thereof.

In the present invention, the animal excretion treating article is capable of preventing the generation of fungi during storage by drying it until the water content reaches 15% by weight or less, preferably, 13% by weight.

If the water-absorptive resin is incorporated in the covering layer section, it is preferred, because the water-absorptive resin acts to absorb water from the periphery of the granular core section during excretion, so that it is swelled to retain the water and hence, the humidity of the covering layer section can be regulated.

Because any of the water-absorptive resin other than the highly water-absorptive resin as well as the highly water-absorptive resin is used as the water-absorptive resin used in the paper diaper, the "water-absorptive resin" used in the present invention means the water-absorptive resin and the highly water-absorptive resin.

In the present invention, the highly water-absorptive resin is a resin capable of maintaining the shape, even if it absorbs water in an amount several ten times to two hundred times the its own weight. Examples of such highly water-absorptive resin are a saponified product of a copolymer of vinyl ester and a ethylenic unsaturated carboxylic acid or the derivative thereof, a graft polymer of starch and acrylic acid, a cross-linked polyacrylic acid, a copolymer of vinyl alcohol and acrylic acid, a partially hydrolyzed polyacrylonitrile, a cross-linked carboxymethyl cellulose, a cross-linked polyethylene glycol, the salt of chitosan, and a gel of plurane. These substances may be mixed alone or in a mixture of two or more with the classified paper powder and used as the covering material.

In the present invention, the water-absorptive resin other than the highly water-absorptive resin includes a water-absorptive resin having a poor water absorbing ability with a water absorbing rate as low as lower than 20 g/g, preferably, 50 g/g in a moisture absorbed or unabsorbed state. Examples of such water-absorptive polyacrylic acid resin or starch-acrylic acid resin as the water absorptive resin having such a low water absorbing ability are a resin having a particle size of 600 $\mu$m or more, and a fine resin having a particle size of 10 $\mu$m or less, e.g., 10 to 5 $\mu$m. These water absorptive resin can be produced, for example, by classification from the paper diaper waste, or can be available as a product out of the specification of the polyacrylic acid resin. It is preferable that the water absorptive resin having a particle size of 600$\mu$m or more is used in the granular core section, and the fine water-absorptive resin having a particle size of 10 $\mu$m or more is used in the covering section.

In the present invention, the larger specific gravity fraction resulting from the classification of the paper diaper powder is obtained by granulation thereof. The granulate of the larger specific gravity fraction contains the plastic material in a relatively high content, and the granular core section of the animal excretion treating article is produced by granulating the larger specific gravity fraction resulting from the classification of the paper diaper powder. The granulate of the larger specific gravity fraction contains the plastic material in a relatively high content, and in order to avoid the generation of fine dust after the granulation to the utmost, it is preferable that the larger specific gravity fraction is granulated into a granulate having a grain size of, for example, 3 mm or more. However, if the larger specific gravity fraction is granulated into grains having a grain size of 5 mm or more, the grains are difficult to be dispersed, for example, from a box for toilet into a room. Even if the grains have been dispersed, the grains can be easily gathered, which is preferred for maintaining the sanitation of the room. In these cases, however, the presence of the grains having the grain size of 3 mm or less and the presence of the grains having the grain size of 5 mm or less are completely not excluded. In the present invention, the granulate may be formed into any of a spherical, columnar, granular, particulate shapes and the like.

In the present invention, however, the granulation may be carried out using a device other than the extruding type granulating device, such as pan-type, drum-type and fluidized-bed type granulating devices.

In producing the animal excretion treating article according to the present invention, the paper diaper is classified into the larger specific gravity fraction and the smaller specific gravity fraction. The dry classifier which can be used includes a pneumatic classifier such as a setting chamber, a vertical air blower, and a projection separator.

In the present invention, the fraction containing the plastic material separated by the classifier and having larger specific gravy is pulverized into a particle size of 4 mm or less and used for the granulation, while the fraction containing the paper powder and the water-absorptive resin and having the smaller specific gravity is pulverized into a particle size of 4 mm or less, mixed together and used for the covering layer section, or pulverized into a particle size of 0.4 mm or less and then used for the covering layer section after regulation of the ratio of the paper powder to the water-absorptive resin. The fraction containing the plastic material having the larger specific gravity and used for the granulation is formed into a granulate having a particle size of 3 mm or more, preferably, 5 mm or less by the extruding type granulating machine, and to form the covering layer section on the surface of such granulate, the fraction having the smaller specific gravity and containing the paper powder and the water-absorptive resin and used for the covering layer section is scattered to cover the granulate. By covering the granulate with the mixture of the paper powder and the water-absorptive resin for the covering layer section in the above manner, an animal excretion treating material can be produced which has a white appearance with the portion colored by the plastic powder being hidden. This animal excretion treating material can absorb well a urine excreted by a mammal or animal, and has an excellent nature, for example, has a good water retention and an increased adhesive property for a portion to which the excretion has been adhered.

In the present invention, in order to avoid the powdering and scuffing of the excretion treating material in service, it is preferable that a blending substance having an adhesive function is blended to the smaller specific gravity fraction used for the covering layer section. Examples of such substance having the adhesive function are a paper powder, a paper-making pulp, a pulverized product of pulp, and a paper powder of a waster produced in the production of a paper diaper and a napkin.

In addition to the smaller specific gravity fraction, an adhesive substance having an adhesive function or a germicidal substance having a germicidal action or these two or more substances may be blended as the blending substances to the animal excretion treating article according to the present invention, particularly to the covering layer section. Therefore, during excretion of a mammal or animal, the excretion such as urine is adhered to the grains of the animal excretion treating article, and portions of the grains to which the excretion such as urine has been adhered are adhered to one another, so that the excretion is wrapped into a massive form. Thus, the excretion treating article used in this manner can be simply and easily post-treated. Examples of such water-dispersible adhesive substances are wheat flour, POVAL (polyvinyl alcohol), starch, corn starch, calboxymethyl cellulose (CMC), plurane or gelatin. They may be used as the compounding substance alone or in the form of a mixture made by combination of two or more of them. Examples of such alcohol-soluble adhesive substance are hydroxyethyl cellulose (HEC), hydroxypropyl cellulose (HPC), or vinyl pyrrolidone (PVP) and the like. Likewise, they may be used as the compounding substance alone or in the form of a mixture made by combination of two or more of them.

In the present invention, when the deodorant and/or the water absorbent is further mixed, the produced animal excretion treating article can exhibit an excellent deodorizing performance and an excellent water absorbing performance. Further, when the substance having the germicidal action is mixed in the covering layer section, the produced animal excretion treating article can be preserved stably over a long period without generation of fungi or the like.

Embodimental Example 1

Referring to FIG. 1, a paper diaper waste powder resulting from loosening and pulverization of a paper diaper waste in a pulverizing machine (not shown) is introduced from the pulverizing machine into a dry paper diaper classifier 1 through an air transport pipe 2 interconnecting the pulverizing machine and the classifier 1, and separated therein into a mixture of a paper powder and a highly water-absorptive resin powder, and a plastic material containing mass. If the yield of the paper powder and the highly water-absorptive resin powder is lowered, the ratio of the plastic material containing mass to the mixture of the paper powder and the highly water-absorptive resin powder is increased, but the amounts of the paper powder and the highly water-absorptive resin powder in the mixture of the paper powder and the highly water-absorptive resin powder are increased, so that the mixture can be almost comprised of the paper powder and the highly water-absorptive resin powder.

The paper powder and the highly water-absorptive resin powder obtained by the dry classification flow from the classifier 1 through a smaller-diameter air transport pipe 3, and are fed to a settling chamber type hopper 4, where the paper powder and the highly water-absorptive resin powder are separated from an air flow and stored. The stored paper powder and highly water-absorptive resin powder are fed to a finely pulverizing machine 6 by a screw feeder connected to the hopper 4, where they are pulverized into a particle size of 0.4 mm or less. The paper powder and highly water-absorptive resin powder pulverized into the particle size of 0.4 mm or less are transported to a paper powder/highly water-absorptive resin hopper 8 by an air transport pipe 7 connected to the pulverizing machine 6.

The covering material mixture consisting of the mixture of the paper powder and highly water-absorptive resin powder pulverized into the particle size of 0.4 mm or less is fed through a quantitative screw feeder 9 connected to the hopper 8 to a covering material mixing device 10, where it is uniformly mixed to form a covering material. However, if the amount of the highly water-absorptive resin powder in the covering material is insufficient, then an proper amount of the highly water-absorptive resin powder may be added to form a covering material. In this example, to regulate the proportion of the highly water-absorptive resin in the above manner, a quantitative screw feeder 12 is mounted to connect the covering material mixing device 10 and a covering material tank 11.

The plastic material containing mass separated by the dry classification flows from the classifier 1 through a larger-diameter air transport pipe 13, and is fed to a settling chamber type hopper 14, where a granulating material consisting of plastic material mixture containing the plastic material, the rubber and the paper powder and highly water-absorptive resin powder left without being separated is separated from the flow of air and stored. The stored granulating material is fed to a coarsely pulverizing machine by a quantitative screw feeder 15 connected to the hopper 14, where it is coarsely pulverized into a particle size of 4 mm or less. The granulating material powder produced by the coarse pulverization into the particle size of 4 mm or less is fed to a granulating material hopper 18 by an air transport pipe 17 connected to the coarsely pulverizing machine 16.

The granulating material powder produced by the coarse pulverization into the particle size of 4 mm or less and transported to the granulating material hopper 18 is fed to a finely pulverizing machine 20 by a quantitative screw feeder 19 connected to the granulating material hopper, where it is pulverized into a particle size of 2 mm or less. A fine powder of the granulating material resulting from the pulverization in the finely pulverizing machine 20 is fed to a granulating material hopper 22 through an air transport pipe 21 connected to the finely pulverizing machine 20, and used as a granulating material fine-powder.

The granulating material hopper 22 is connected to quantitative screw feeder 23 for supplying the granular material. The quantitative screw feeder 23 is connected to a main screw feeder 24. A metering hopper 25 for sodium benzoate used as a germicide is connected to a quantitative screw feeder 26 connected to the main screw feeder 24, so that the sodium benzoate as the germicide can be supplied by the quantitative screw feeder 26 to the granulating material fine-powder which has been already supplied to the main screw feeder 24.

In this example, the main screw feeder 24 is connected to a granulating material mixing device 27. In this example, a water supply pipe 28 is opened into the granulating material mixing device 27, so that water can be supplied into the granulating material mixing device 27. The mixture of the granulating material fine-powder and the sodium benzoate supplied to a quantitative screw feeder 29 is supplied to the granulating material mixing device 27, where it is mixed with the water. A granulating material mixture of the granulating material fine-powder, the sodium benzoate and the water mixed in the granulating material mixing device 27 is supplied to the quantitative screw feeder 29 for transporting the granulating material mixture and then supplied from the quantitative screw feeder 29 for transporting the granulating material mixture to a hopper 31 for an extruding type granulating device 30.

The granulating material mixture, which is the mixture of the plastic, the rubber, the paper powder, the highly water-absorptive resin, the sodium benzoate and the water, is introduced from the granulating material hopper 31 to the extruding type granulating device 30, where it is extruded from a die 32 to form a columnar granulate. In this example, a vibration screening machine 33 including an upper screen having a screen opening of 8 mm and a lower screen having a screen opening of 4 mm is mounted below the die 32 of the granulating device 30, so that grains in the extruded granulate smaller than 4 mm are separated off for regulation of the granulation to the grain size of 8 to 4 mm. The granulate fed to the vibration screening machine 33 is loosened into individual grains by the vibration of the vibration screening machine 33. These grains are then fed from an oversized outlet 34 having an opening larger than 4 mm in the vibration screening machine to a covering device 35 connected to the outlet 34. The undersized grains smaller than 4 mm are fed from an undersized outlet 36 to a undersized-grain transporting conveyer belt 37 connected to the undersized outlet 36 and then fed via the granulating material mixture transporting screw feeder 29 connected to the conveyer belt 37 back to the granulating device 30, wherein they are granulated again.

In this example, the grains regulated to a grain size in a range of 8 to 4 mm, i.e., the oversized grains larger than 4 mm are fed from the oversized outlet 34 to the covering device 35.

In this example, the covering devices are provided at three stages. In the first covering device 35, the covering material consisting of the mixture of the paper powder having a particle size of 0.4 mm or less and the highly water-absorptive resin is scattered from a supply port 41 of a covering material hopper 40 connected to the covering material mixture mixing device 10 through a quantitative screw feeder 39 onto the oversized granulate supplied onto a rotating shallow edged disc 38. In order to ensure that the covering material is adhered to the surface of the oversized granulate all over, the scattered covering material and the oversized granulate are fed from a covering material outlet 42 of the first covering device 35 to a second covering device 43 of the same type as the first covering device 35. The granulate covered with the covering material in the second covering device 43 is fed from a covering material outlet 44 of the second covering device 43 to a third covering device 45, where such granulate is covered with the covering material. The granulate covered with the covering material in the third covering device 45 is fed from a covering material outlet 46 of the third covering device to a vibration screening machine 47 including a screen having a screen opening of 10 mm at an upper stage and a screen having a screen opening of 5 mm at a lower stage, where the remaining covering material left without adhering to the granulate and fragments of the finely-divided granulate and the like are separated off.

The mixture of the covering material and the granulate fragments removed in the vibration screening machine 47 is delivered from an undersized outlet 48 smaller than 5 mm to an undersized grain transporting conveyer belt 49 connected to the outlet 48 and then via the granulating material mixture transporting quantitative screw feeder 29 back to the granulating device 30, where it is granulated again.

The covered granulate regulated to a grain size in a range of 10 to 5 mm in the vibration screening machine 47 is fed from an oversized outlet 50 larger than 5 mm in the vibration screening machine 47 to a first dryer 54 connected to a covered granulate transporting conveyer belt 53 by covered granulate transporting conveyer belts 51, 52 and 53.

The covered granulate fed to the first dryer 54 is dried in the first dryer 54 which is a hot air drying machine.

The dried covered granulate dried in the first dryer 54 is delivered from a dried material outlet 55 of the first dryer 54 to a dried material transporting conveyer belt 56 connected to the outlet 55. The dried covered granulate delivered is fed through a dried material transporting conveyer belt 57 to a spray device 58 for spraying a diluted solution of polyvinyl alcohol in order to prevent the fluffing or napping of the covering material portion in the surface of the covered granulate or the like. In the spray device 58, a diluted solution of polyvinyl alcohol is sprayed from a spraying diluted polyvinyl alcohol solution tank 59. The covered granulate sprayed with the diluted solution of polyvinyl alcohol is delivered from a covered-granulate transporting conveyer belt 60 connected to the spray device 58 to a second dryer 61 which is a hot air drying machine.

The covering devices 35, 43 and 45 and the spraying device 58 are formed so that the scattering of the covering material and the spraying of the spray solution to the granulate can be performed at a constantly given ratio.

The covered granulate dried in the second dryer 61 is fed from an dried material outlet 62 of the second dryer 61 through dried granulate transporting conveyer belts 63 and 64 connected to the dried material outlet 62 to a product hopper 65.

The product consisting of the dried covered granulate fed to the product hopper 65 is delivered from an outlet 66 of the product hopper 65 to a vibration screen type grain size-regulating device 67 including a screen having a screen opening of 10 mm at an upper stage and a screen having a screen opening of 5 mm at a lower stage, where the covered granulate having a grain size of 10 mm or more unsuitable as a product and the granulate having a grain size smaller than 5 mm are separated off. The separated-off dried covered granulates are returned through the granulate material mixture transporting screw conveyer 29 to the granulating device 12, where they are granulated again.

The dried covered granulate regulated to a grain size in a range of 10 to 5 mm in the vibration screen type grain size-regulating device 67 is fed from an oversized regulated granulate outlet 68 larger than 5 mm in the vibration screen type grain size-regulating device 67 through a conveyer belt 69 to a granulate packing device 70, where it is packed into a sack and shipped.

The apparatus used in this example is constructed in the above manner. Therefore, a predetermined amount of paper diaper waste powder is pulverized and classified in the classifier 1 into the mixture of the paper powder and the highly water-absorptive resin and the plastic material mixture. The mixture of the paper powder and the highly water-absorptive resin is finely pulverized into a particle size of 0.4 mm or less and uniformly mixed in the covering material mixing device 10 to provide the covering material which is then placed into the covering material hopper 40. On the other hand, the plastic material mixture obtained by the classification in the classifier 1 is coarsely pulverized into a particle size of 4 mm or less by the coarsely pulverizing machine 16 and then pulverized into a particle size of 2 mm or less to provide a granulating material. The granulating material is supplied with the sodium benzoate in the main screw feeder 24 and fed to the granulating material mixing device 27, where water is supplied to the granulating material, and they are uniformly mixed.

The granulating material mixture resulting from such mixing is a mixture of the paper powder, the highly water-absorptive resin, the plastic material, the rubber material and the water. The granulating material mixture is fed from the granulating material mixture transporting screw feeder 29 to the extruding type granulating device 30, where it is granulated. In this example, the extruding type granulating device 30 is constructed so that the granulating material mixture is extruded by the rotation of the screw to form a granulate having a section corresponding to a bore provided in the die 32. In this example, the used die has a bore diameter of 5.5 mm and a thickness of 30 mm.

The granulate grains extruded from the die 32 of the extruding type granulating device 32 are fed to the vibration screening machine, for example, having an upper screen having a screen opening of 8 mm and a lower screen having a screen opening of 4 mm, where they are screened. The undersized grains having a grain size smaller than 4 mm which is the size of the screen opening of the lower screen are returned from the undersized outlet 36 smaller than the screen opening of the lower screen of 4 mm through the undersized grain transporting conveyer belt 37 to the granulating material mixture transporting screw feeder 29 and fed to the extruding type granulating device 30, where they are granulated again.

The granulate having a grain size of 8 to 4 mm, i.e., the oversized grains larger than 4 mm are fed from the oversized granulate transporting outlet 34 to the rotatable disk-type first covering device 35. The granulate fed to the first covering device 35 is covered by coating the covering material having the particle size of 0.4 mm or less. The granulate covered in the first covering device 35 is fed to the subsequent second and third covering devices 43 and 45, where the granulate is brought into contact with and covered with the already-scattered covering material, while being rolled by the vibration type disk.

The granulate grains covered with the covering material in the covering devices 35, 43 and 45 are loosened in the vibration screening machine 47. The grains having a grain size of 10 to 5 mm are fed from the oversized outlet 50 larger than 5 mm in the vibration screening machine 47 through the conveyer belts 51, 52 and 53 to the first drier 54, where they are dried. On the other hand, the granulate grains having a grain size smaller than 5 mm are fed to the granulating material mixture transporting screw feeder 29 11 by the conveyer belt 30 for transporting the undersized grains smaller than 5 mm, and are then returned to the granulating device 30, where they are granulated again.

The temperature of the first dryer 54 is maintained at 90° C. or more. The dried granulate is fed to the device 39 for spraying the diluted solution of polyvinyl alcohol, in order to prevent the fluffing or napping or the like of the covering material portion on the surface of the covered granulate. In the spraying device 58, the diluted solution of polyvinyl alcohol is sprayed from the spraying diluted polyvinyl alcohol solution tank 59. The covered granulate sprayed with the diluted solution of polyvinyl alcohol is delivered through the covered granulate transporting conveyer belt 60 to the second dryer 61 which is a hot air drying machine, where it is dried at a drying temperature lower than that in the first drier. The dried covered granulate is fed to the product hopper 65. The dried covered granulate placed into the product hopper 65 is regulated in grain size in the grain-size regulating device 67 and fed to the product packing device 70, where it is packed in a sack and shipped.

In this example, the addition of the volatile empensrine serving as the germicide is not illustrated, but if the use of the germicide is required, a solution of volatile empensrine in a non-alcoholic organic solvent may be sprayed along with the diluted solution of polyvinyl alcohol after drying of the granulate in the first dryer.

In this example, the sodium benzoate as the germicide is incorporated in the main screw feeder 24. Alternatively, the sodium benzoate solution may be sprayed along with the diluted solution of polyvinyl alcohol. In addition, the diluted solution of polyvinyl alcohol and the volatile empensrine and germicide in solvents may be formed separately and may be sprayed separately or in the form of a mixture.

Embodimental Example 2

Figure 2:
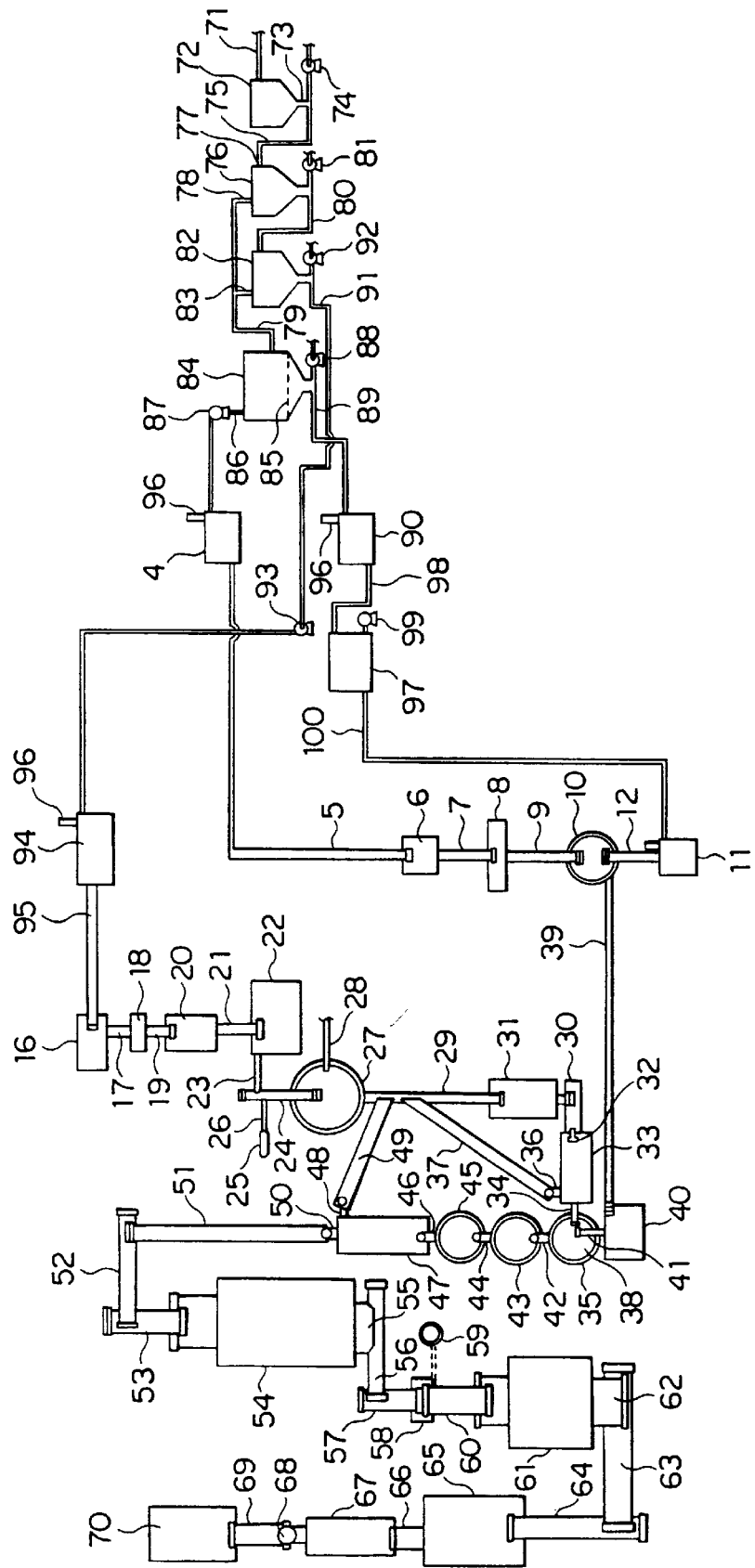
FIG. 2 is a schematic illustration showing steps of production of an animal excretion treating article according to another embodiment of the present invention.

Referring to FIG. 2, a paper diaper waste supplying belt conveyer 71 is connected to an introducing inlet of a rotary cutter-type coarsely pulverizing machine 72, so that a paper diaper waste is introduced into the coarsely pulverizing machine 72 by the supplying belt conveyer 71 and pulverized into grains having a particle size of 50 to 80 mm. An outlet 73 located at a lower portion of the coarsely pulverizing machine 72 is connected to a transport pipe 75 having a blower 74 provided thereon. The transport pipe 75 is connected to an introducing inlet 77 located at an upper portion of a cyclone-type coarse classifier 76. A powder resulting from the coarse pulverization of the paper diaper waste is fed to the coarse classifier 76 by the blower 74, where a coarse powder of pulverized plastic material is separated in a dry manner from a mixture of the coarsely pulverized paper powder and highly water-absorptive resin, for example, with a residual rate of the plastic material of 95%.

The mixture of the coarsely pulverized paper powder and highly water-absorptive resin free from the powder of coarsely pulverized plastic material flows from an outlet located at an upper portion of the coarse classifier 76. A blower 81 is mounted on a transport pipe 80 connected to the outlet located at an upper portion of the coarse classifier 76, so that a coarsely classified residue of the plastic material is discharged from the coarse classifier by the blower 81 and the transport pipe 80. The coarsely classified residue of the plastic material transported by the blower 81 and the transport pipe 80 is fed to a fine classifier 82, where the plastic material is partially separated in a dry finely-classifying manner from the coarsely classified mixture of the paper powder and the highly water-absorptive resin under a classifying condition of a residual rate of the plastic material of 95%. The mixture of the paper powder and the highly water-absorptive resin resulting from the fine classification flows from an outlet 83 located at an upper portion of the fine classifier 82.

In this way, the mixture of the paper powder and the highly water-absorptive resin produced as a result of the dry coarse classification and the dry fine classification is fed to a screening device 84 by a transport pipe 79. A screen 85 is mounted in the screening device 84, so that the mixture the paper powder and the highly water-absorptive resin resulting from the fine classification is screened by the screen 85 into the paper powder and the highly water-absorptive resin from the difference in particle size between them. The resulting oversized paper powder is fed from the screening device 84 through a blower 87 located on the screening device 84 to the paper powder hopper 4 by a blower 87. On the other hand, the resulting undersized highly water-absorptive resin is fed from an outlet at a lower portion of the screening device 84 through a transport pipe 89 to a highly water-absorptive resin hopper 90 by a blower 88.

The finely classified plastic material, from which the paper powder and the highly water-absorptive resin have been partially separated, is drawn from a transport pipe 91 connected to the outlet at the lower portion of the fine classifier 82 by blowers 92 and 93, and is fed to a plastic material hopper 94. The plastic material fed to the settling chamber-type plastic material supplying hopper 94 contains the plastic material, the rubber material, and the paper powder and highly water-absorptive resin left without being separated, and is separated from the flow of air while containing them, and is stored.

In this example, any of the paper powder hopper 4, the highly water-absorptive resin hopper 90 and the plastic material hopper 94 are a settling chamber type hopper having a bag filter 96 located at an upper portion thereof, so that each of the paper powder, the highly water-absorptive resin and the plastic material is separated from the flow of air by the bag filter 96.

In this manner, each of the paper powder, the highly water-absorptive resin powder and the plastic material powder produced as the result of the coarse classification and the fine classification is stored in corresponding one of the paper powder hopper 4, the highly water-absorptive resin hopper 90 and the plastic material hopper 94, respectively.

The plastic material powder stored in the plastic material hopper 94 is fed from the plastic material hopper 94 to the coarsely pulverizing machine 16 by a plastic material transporting quantitative screw feeder 95 which connects the plastic material hopper 94 and the coarsely pulverizing machine 16, where it is coarsely pulverized into a particle size of 4 mm or less. The plastic material powder coarsely pulverized into the particle size of 4 mm or less is transported to the plastic material supplying hopper 18 by the air transport pipe 17 connected to the coarsely pulverizing machine 16.

The plastic material powder transported to the plastic material supplying hopper 18 is fed to the finely pulverizing machine 20 by the quantitative screw feeder 19 connected to the plastic material supplying hopper 18, where it is pulverized into a particle size of 2 mm or less. The fine powder of the plastic material pulverized in the finely pulverizing machine 20 is fed to the granulating plastic material hopper 22, where it is stored as a granulating fine plastic material powder.

The granulating plastic material powder hopper 22 is connected to the granulating plastic material supplying quantitative screw feeder 23 which is connected to the main screw feeder 24. The metering hopper 25 for the sodium benzoate as the germicide is connected to the inlet of the quantitative screw feeder 26 connected at its outlet to the main screw feeder 24, so that the sodium benzoate as the germicide can be supplied to the granulating plastic material fine-powder already supplied to the main screw feeder 24 by the quantitative screw feeder 26.

In this example, the outlet of the main screw feeder 24 is connected to the granulating material mixing device 27. In this example, the water supply pipe 28 is opened into the granulating material mixing device 27, so that water can be supplied into the granulating material mixing device 27. The mixture of the granulating plastic material fine-powder and the sodium benzoate supplied to the granulating material mixing device 27 is mixed with the water in the granulating material mixing device 27. The granulating material mixture of the granulating plastic material fine-powder, the sodium benzoate and the water mixed in the granulating material mixing device 27 is discharged from the granulating material mixing device 27 into the granulating material mixture transporting quantitative screw feeder 29 connected to the granulating material mixing device 27 and is then supplied to the hopper 31 of the extruding-type granulating device 30 by the quantitative screw feeder 29.

The granulating material mixture consisting of the mixture of the plastic material, the rubber material, the paper powder, the highly water-absorptive resin, the sodium benzoate and the water is introduced from the granulating material hopper 31 into the extruding-type granulating device 30, where such mixture is extruded from the die 32 to provide a columnar granulate. In this example, the vibration screening machine 33 including the upper screen having the screen opening of 8 mm and the lower screen having the screen opening of 4 mm is mounted below the die 32 of the granulating device 30, so that the granulate resulting from the extrusion is regulated in grain size by separation-off of grains smaller than 4 mm, and in this manner, a granular core section is formed.

The granular core section contains a considerable proportion of the paper powder and the highly water-absorptive resin mixed therein without being separated and hence, has a high water absorbing capability and can be used as it is, for the animal excretion treating article.

In this example, however, in order to further increase the water absorbing capability and to reduce the calorific value after use of the animal excretion treating article, the granular core section is covered with the mixture of the paper powder and the highly water-absorptive resin.

The granular core section formed of the granulate fed to the vibration screening machine 33 is loosened into individual grains by the vibration of the vibration screening machine 33 and delivered from the oversized outlet larger than 4 mm in the vibration screening machine to the covering device 35 connected to the outlet 34.

In this example, the covering material is prepared by mixing the paper powder and the highly water-absorptive resin resulting from the classification and stored in the corresponding hoppers.

In this example, the quantitative screw feeder 5 is connected to the finely pulverizing machine 6 is connected to the paper powder hopper 4, so that the paper powder stored in the paper powder hopper 4 is fed to the finely pulverizing machine 6 by the quantitative screw feeder 5, where it is pulverized into a particle size of 0.4 mm or less. The paper powder pulverized into the particle size of 0.4 mm or less is transported to the covering paper powder supplying hopper 8 by the air transport pipe 7 connected to the pulverizing machine 6.

In this example, a quantitative screw feeder 98 connected to a highly water-absorptive resin finely-pulverizing machine 97 is connected to the highly water-absorptive resin hopper 90, so that the highly water-absorptive resin powder stored in the highly water-absorptive resin hopper 90 is fed to the pulverizing machine 97 by the quantitative screw feeder 98, where it is pulverized into a particle size of 0.4 mm or less. A transport pipe 100 equipped with a blower 99 is connected to an outlet at a lower portion of the pulverizing machine 97, so that the fine powder of the highly water-absorptive resin resulting from the pulverization in the pulverizing machine 97 is transported to a settling chamber-type covering highly water-absorptive resin supplying hopper 11 provided with a bag filter 96 through the transport pipe 100 and stored in the highly water-absorptive resin supplying hopper 11.

The paper powder pulverized into the particle size of 0.4 mm or less and stored in the covering paper powder hopper 8 is fed through the quantitative screw feeder 9 connected to the covering paper powder hopper 8 to the covering material mixing device 10. The highly water-absorptive resin having the particle size of 4 mm or less is fed from the covering highly water-absorptive resin supplying hopper 11 to the covering material mixing device 10. The paper powder and the highly water-absorptive resin fed to the covering material mixing device 10 are uniformly mixed in the covering material mixing device to provide a covering material. If the amount of the highly water-absorptive resin in the covering material is insufficient, however, a suitable amount of the highly water-absorptive resin may be added to form a covering material. In this example, in order to regulate the ratio of the amount of the paper powder to the amount of the highly water-absorptive resin in the above manner, the quantitative screw feeder 12 interconnecting the covering material mixing device 10 and the highly water-absorptive resin supplying hopper 11 is mounted.

The quantitative screw feeder 39 connected to the covering material hopper 40 is mounted at the outlet of the covering material mixing device 10, so that the powdery mixture of the paper powder and highly water-absorptive resin powder to be granulated of the covering material prepared by the mixing in the covering material mixing device is fed to the covering material hopper 40 by the quantitative screw feeder 39 and stored in the hopper 40.

The granular core section formed of the granulated fed to the vibration screening machine is loosened into individual grains by the vibration screening machine 33 having the screen opening of 4 mm, and the grains are delivered from the oversized outlet larger than 4 mm in the vibration screening machine 33 to the covering device 35. On the other hand, the undersized grains smaller than 4 mm in the vibration screening machine 33 is delivered from the undersized outlet 36 to the undersized grain transporting conveyer belt 37 connected to the undersized outlet 36 and passed via the granulating material mixture transporting screw feeder 29 connected to the conveyer belt 37 back to the granulating device 30, where they are granulated again.

In this example, the granular core section of the granulate regulated into the grain size of 8 to 4 mm, i.e., the oversized granulate unscreened in the vibration screening machine having the screen opening of 4 mm is fed from the oversized outlet 34 to the covering device 35. The covering material is scattered to the granular core section fed to the covering device 35, from the covering material hopper 40 connected to the quantitative screw feeder 41.

In this example, the covering devices are mounted at three stages. In the first covering device 35, the covering material consisting of the powdery mixture of the paper powder having a particle size of 0.4 mm or less and the highly water-absorptive resin is scattered from a quantitative screw feeder 41 of the covering material hopper 40 onto the oversized granulate supplied onto a rotating shallow edged disc 38. In order to ensure that the covering material is adhered to the surface of the granular core section all over, the scattered covering material and the granular core section of the oversized granulate are fed from a covering material outlet 42 of the first covering device 35 to the second covering device 43 of the same type as the first covering device 35. In the second covering device 43, the granulate covered in the first covering device is also subjected to a covering treatment with the covering material. The granulate subjected to the covering treatment in the second device 43 is fed from a covering material outlet 44 of the second covering device 43 to the third covering device 45, where such granulate is further subjected to a covering treatment with the covering material as in the other covering devices. The granulate subjected to the covering treatment in the third covering device 45 is fed from a covering material outlet 46 of the third covering device to a vibration screening machine 47 including a screen having a screen opening of 10 mm at an upper stage and a screen having a screen opening of 5 mm at a lower stage, where the remaining covering material left without adhering to the granulate and fragments of the finely-divided granulate and the like are separated off.

The mixture of the covering material and the granulate fragments removed in the vibration screening machine 47 is delivered from an undersized outlet 48 smaller than 5 mm to an undersized grain transporting conveyer belt 49 connected to the outlet 48 and then via the granulating material mixture transporting quantitative screw feeder 29 connected to the conveyer belt 49 back to the granulating device 30, where it is granulated again.

The covered granulate regulated to a grain size in a range of 10 to 5 mm in the vibration screening machine 47 is fed from an oversized outlet 50 larger than 5 mm in the vibration screening machine 47 to a first dryer 54 connected to a covered granulate transporting conveyer belt 53 by covered granulate transporting conveyer belts 51, 52 and 53.

The covered granulate fed to the first dryer 54 is dried in the first dryer 54 which is a hot air drying machine.

The dried covered granulate dried in the first dryer 54 is delivered from a dried material outlet 55 of the first dryer 54 to a dried material transporting conveyer belt 56 connected to the outlet 55. This dried covered granulate delivered is fed via a dried material transporting conveyer belt 57 to a spray device 58 for spraying a diluted solution of polyvinyl alcohol in order to prevent the fluffing or napping of the covering material portion in the surface of the covered granulate or the like. In the spray device 58, a diluted solution of polyvinyl alcohol is sprayed from a spraying diluted polyvinyl alcohol solution tank 59. The covered granulate sprayed with the diluted solution of polyvinyl alcohol is delivered from a covered-granulate transporting conveyer belt 60 connected to the spray device 58 to a second dryer 61 which is a hot air drying machine.

The covering devices 35, 43 and 45 and the spraying device 58 are formed so that the scattering of the covering material and the spraying of the spray solution to the granulate can be performed at a constantly given ratio.

The covered granulate dried in the second dryer 61 is fed from an dried material outlet 62 of the second dryer 61 via dried granulate transporting conveyer belts 63 and 64 connected to the dried material outlet 62 to a product hopper 65.

The product consisting of the dried covered granulate fed to the product hopper 65 is delivered from an outlet 66 of the product hopper 65 to a vibration screen type grain size-regulating device 67 including a screen having a screen opening of 10 mm at an upper stage and a screen having a screen opening of 5 mm at a lower stage, where the dried covered granulate having a grain size of 10 mm or more unsuitable as a product and the granulate having a grain size smaller than 5 mm are separated off. The separated-off dried covered granulates are returned via the granulate material mixture transporting screw conveyer 29 to the granulating device 30, where they are granulated again.

The dried covered granulate regulated to a grain size in a range of 10 to 5 mm in the vibration screen type grain size-regulating device 67 is fed from an oversized regulated granulate outlet 68 larger than 5 mm in the vibration screen type grain size-regulating device 67 through a conveyer belt 69 to a granulate packing device 70, where it is packed into a sack and shipped.

The apparatus used in this example is constructed in the above manner. Therefore, a predetermined amount of paper diaper waste powder is coarsely pulverized in the coarsely pulverizing machine 72 and classified in the coarse classifier 76 and the fine classifier 82 into the mixture of the paper powder and the highly water-absorptive resin and the plastic material containing mixture containing the paper powder and the highly water-absorptive resin.

The mixture of the paper powder and the highly water-absorptive resin is classified by the screening device 84. The mixture of the paper powder and the highly water-absorptive resin resulting from the classification and the screening is finely pulverized into a particle size of 0.4 mm or less in the fine pulverizing machine 6 or 97 and uniformly mixed in the covering material mixing device 10 to provide a covering material which is then placed into the covering material hopper.

On the other hand, the plastic material powder obtained by the classification in the coarse classifier 76 and the fine classifier 82 still contains the unseparated paper power and highly water-absorptive resin and can be used as a granulate or granular core section for an animal excretion treating article. Thereupon, in this example, the plastic material powder is coarsely pulverized into a particle size of 4 mm or less by the coarsely pulverizing machine 16 and then pulverized into a particle size of 2 mm or less by the finely pulverizing machine 20 to provide a granulating material. The granulating material is supplied with the sodium benzoate in the main screw feeder 24 and fed to the granulating material mixing device 27, where water is supplied to the granulating material, and they are uniformly mixed.

The granulating material mixture resulting from such mixing is a mixture of the paper powder, the highly water-absorptive resin, the plastic material, the rubber material and the water. The granulating material mixture is fed from the granulating material mixture transporting screw feeder 29 to the extruding type granulating device 30, where it is granulated. In this example, the extruding type granulating device 30 extrudes the granulating material mixture by the rotation of the screw to form a granulate having a section corresponding to a bore provided in the die 32. In this example, the used die has a bore diameter of 5.5 mm and a thickness of 30 mm.

The grains of the granulate formed by extrusion from the die 32 of the extruding type granulating device 30 are fed to the vibration screening machine 33, for example, having an upper screen having a screen opening of 8 mm and a lower screen having a screen opening of 4 mm, where they are screened. The undersized grains having a grain size smaller than the screen opening of the lower screen of 4 mm are returned from the undersized outlet 36 smaller than the screen opening of the lower screen of 4 mm via the undersized grain transporting conveyer belt 37 to the granulating material mixture transporting screw feeder 29 and fed to the extruding type granulating device 30, where they are granulated again.

The granulate having a grain size of 8 to 4 mm, i.e., the oversized grains larger than 4 mm are fed from the oversized granulate transporting outlet 34 to the rotatable disk-type first covering device 35. The granulate fed to the first covering device 35 is covered by coating the covering material having the particle size of 0.4 mm or less. The granulate covered in the first covering device 35 is fed to the subsequent second and third covering devices 43 and 45, where the granulate is brought into contact with and covered with the already-scattered covering material, while being rolled by the vibration type disk.

The granulate grains covered with the covering material in the covering devices 35, 43 and 45 are loosened in the vibration screening machine 47. The grains having a grain size of 10 to 5 mm are fed from the oversized outlet 50 larger than 5 mm in the vibration screening machine 47 through the conveyer belts 51, 52 and 53 to the first drier 54, where they are dried. On the other hand, the granulate grains having a grain size smaller than 5 mm are fed to the granulating material mixture transporting screw feeder 29 11 by the conveyer belt 49 for transporting the undersized grains smaller than 5 mm, and are then returned to the granulating device 30, where they are granulated again.

The temperature of the first dryer 54 is maintained at 90° C. or more. The dried granulate is fed to the device 58 for spraying the diluted solution of polyvinyl alcohol, in order to prevent the fluffing or napping or the like of the covering material portion on the surface of the covered granulate. In the spraying device 58, the diluted solution of polyvinyl alcohol is sprayed from the spraying diluted polyvinyl alcohol solution tank 59. The covered granulate sprayed with the diluted solution of polyvinyl alcohol is delivered through the covered granulate transporting conveyer belt 60 to the second dryer 61 which is a hot air drying machine, where it is dried at a drying temperature lower than that in the first drier. The dried covered granulate is fed to the product hopper 65. The dried covered granulate placed into the product hopper 65 is regulated in grain size in the grain-size regulating device 67 and fed to the product packing device 70, where it is packed in a sack and shipped.

Even in this example, the addition of the volatile empensrine serving as the germicide is not illustrated, but if the use of the germicide is required, a solution of volatile empensrine in a non-alcoholic organic solvent may be sprayed along with the diluted solution of polyvinyl alcohol after drying of the granulate in the first dryer. In addition, the sodium benzoate as the germicide is incorporated in the main screw feeder 24, but the solution of sodium benzoate may be sprayed along with the diluted solution of polyvinyl alcohol. Alternatively, the diluted solution of polyvinyl alcohol and the solution of volatile empensrine and germicide in a solvent may be formed separately and may be sprayed separately or in the form of a mixture.

EXAMPLE 1

This example was carried out according to a flow chart shown in FIG. 1.

In this example, a paper diaper waste powder resulting from the pulverization into a particle size of 4 mm or less has a composition comprising 17 parts by weight (about 38% by weight) of a paper powder, 12 parts by weight (about 27% by weight) of a highly water-absorptive resin and 16 parts by weight (about 35% by weight) of a polypropylene non-woven fabric, a polyethylene sheet and the like. This paper diaper waste powder was produced by classification such that the classification yield of the paper powder and the highly water-absorptive resin is about 20% by weight based on the weight of the classified paper diaper. The mixture of the paper powder and the highly water-absorptive resin resulting from the classification was pulverized into a particle size of 0.3 mm or less for the purpose of being used as a covering material. 100 Parts by weight of a plastic material containing mixture was used as a material to be granulated, and was pulverized, and water was mixed to the pulverized mixture so that a water content of 40% by weight was achieved, thereby producing a granulating material mixture. This granulating material mixture was placed into the extruding zone of the granulating device and granulated by extrusion through a die having an opening of a diameter of 5.5 mm and a plate thickness of 30 mm, and properly chopping the extrudate by a chopper. The resulting granulate was regulated in grain size in the grain-size regulating device and placed into a vibration disc-type covering device, where the covering material consisting of a mixture of 60 parts by weight of the paper powder having the particle size of 0.3 mm or less and 40 parts by weight of the highly water-absorptive resin having the particle size of 150 m or less was scattered onto the surface of the granulate with a proportion of 15% by weight based on the granulate to cover the granulate. The covered granulate was loosened in the grain-size regulating machine and dried by the hot air drier, until water content reached 13%.

The obtained product was a granular material having a grain size of 10 to 5 mm. The calorific value of granular material was of 6,149 kcal/kg as absolutely dried, and 5,266 kcal/kg as dried with the water content of 13%. 30 Grams of water was absorbed into 14.7 grams of this cat sand. The calorific value upon the absorption of the water, i.e., in a wetted state when the cat sand was used, was of 1,309 kcal/kg, which indicates that the cat sand can be burnt up after being used. The grains of this granulate were gathered and used as a sand for a cat toilet.

In a room, a pseudo urine made by dissolving 10 g of table salt and 10 ml of aqueous ammonia into 1,000 ml of tap water was added to 50 g of the sand for the cat toilet in an area of 30 ml and a diameter of 20 mm, and a sand portion coagulated by the pseudo urine was removed. In the toilet sand in this example, the amount of a toilet sand portion coagulated by the pseudo urine was of 14.7 g.

Thus, the water absorptivity of the toilet sands in this example was 30/14.7 times, i.e., 2.04 times.

The sand for the cat toilet were laid at a thickness of 3 cm in a cat toilet and used. The cat used the sand as a toilet as usual, and as a result, there was no hindrance for use.

After the cat used the sand for excretion, that portion of the sand for cat toilet in which the cat excreted could be easily removed. Moreover, the sand for the cat toilet in this example had water-absorbing and deodorizing properties and hence, the generation of an uncomfortable odor in the room could be avoided.

EXAMPLE 2

Even in this example, a paper diaper waste powder produced by the pulverization into a particle size of 4 mm or less has a composition comprising 17 parts by weight of a paper powder, 12 parts by weight of a highly water-absorptive resin, and 16 parts by weight of a polypropylene non-woven fabric, a polyethylene sheet and the like, as in Example 1.

In this example, the paper diaper waste powder resulting from the previous removal of the highly water-absorptive resin was classified into the paper powder and the polypropylene non-woven fabric and the polyethylene sheet. The yield of the paper powder was of about 52% based on the classified paper diaper, and the yield of the polypropylene non-woven fabric and the polyethylene sheet was of 48% by weight. The paper powder produced by the classification was pulverized into a particle size of 0.3 mm or less for the purpose of being used as a covering material.

100 Parts by weight of a plastic material containing mixture produced by the classification was used as a material to be granulated, and was pulverized into a particle size of 2 mm or less, and water was added and mixed to the pulverized mixture so that a water content of 40% by weight was achieved, thereby producing a granulating material mixture. This granulating material mixture was placed into the extruding zone of the granulating device and granulated by extrusion through a die having an opening of a diameter of 5.5 mm and a plate thickness of 30 mm, and properly chopping the extrudate by a chopper. The resulting granulate was regulated in grain size in the grain-size regulating device and placed into a vibration disc-type covering device, where the covering material having the particle size of 0.3 mm or less was scattered onto the surface of the granulate with a proportion of 15% by weight based on the granulate, while vibrating the dish-like disc, thereby covering the granulate. In this example, the covering material was made by mixing 40 parts by weight of the highly water-absorptive resin having the particle size of 150 $\mu$m or less and produced by previous removal from the paper diaper waste powder, to 60 parts by weight of the paper powder produced by the classification.

The covered granulate was loosened by the grain-size regulating machine and dried by the hot air drier, until the water content reached 13%. The resulting product was a granular material having a grain size of 10 to 5 mm. The calorific value of granular material was of 8,769 kcal/kg as absolutely dried, and 7,546 kcal/kg as dried with the water content of 13%. 30 Grams of water was absorbed into 16 grams of this cat sand. The calorific value upon the absorption of the water, i.e., in a wetted state when the cat sand was used, was of 2,225 kcal/kg, which indicates that the cat sand can be burnt up after being used.

The grains of this granulate were gathered and used as a sand for a cat toilet.

In a room, a pseudo urine made by dissolving 10 g of table salt and 10 ml of aqueous ammonia into 1,000 ml of tap water was added to 50 g of the sand for the cat toilet in an area of 30 ml and a diameter of 20 mm, and a sand portion coagulated by the pseudo urine was removed. In the toilet sand in this example, the amount of a toilet sand portion coagulated by the pseudo urine was of 14.7 g.

Thus, the water absorptivity of the toilet sands in this example was 30/14.7 times, i.e., 2.04 times.

The sand for the cat toilet were laid at a thickness of 3 cm in a cat toilet and used. The cat used the sand as a toilet as usual, and as a result, there was no hindrance for use.

After the cat used the sand for excretion, that portion of the sand for cat toilet in which the cat excreted could be easily removed. Moreover, the sand for the cat toilet in this example had water-absorbing and deodorizing properties and hence, the generation of an uncomfortable odor in the room could be avoided.

EXAMPLE 3

This example was carried out according to a flow chart shown in FIG. 2.

In this example, the recovery rate of a cotton-like pulp from a powder of paper diaper waste pulverized was of 80%, and the recovery rate of a highly water-absorptive resin was of about 50%. A plastic material containing product resulting from the classification had a composition comprising 13% by weight of the cotton-like pulp, 22% by weight of the highly water-absorptive resin, and 65% by weight of an external material consisting of a plastic material, a rubber material and the like.

In this example, the plastic material containing product was used for a granular core section.

The plastic material powder was pulverized into a particle size of 2 mm or less, and water was added to the pulverized plastic powder, so that the water content reached 38 to 42% by weight. The plastic material powder and water were mixed by sufficiently agitating them in a mixer to produce a granulating material mixture. This granulating material mixture was placed into the extruding zone of the granulating device and granulated by extrusion through a die having an opening of a diameter of 5.5 mm and a plate thickness of 30 mm, and properly chopping the extrudate by a chopper, thereby a granulate for forming a granular core section. The granulate was regulated in grain size in the grain-size regulating device and placed into a vibration disc-type covering device, where the covering material consisting of a mixture of 10.5 parts by weight of the pulverized cotton-like pulp having the particle size of 0.4 mm or less and 4.5 parts by weight of the highly water-absorptive resin having the particle size of 0.4 mm or less was scattered onto the surface of the granulate to cover the granulate. The covered granulate was loosened in the grain-size regulating machine and dried by the hot air drier. For the purpose of preventing the peeling-off, a diluted solution of polyethylene glycol, after the drying, was sprayed onto the surface of the covered granulate and dried again. The drying was carried out until the content of water in the covered granulate reached 11%. The obtained product was a granular material having a grain size of 10 to 5 mm. The calorific value of the granular material was of 6,080 kcal/kg as absolutely dried, and 5,341 kcal/kg as dried with the water content of 11%. The calorific value upon the absorption of 20 g of a pseudo urine into 8.5g of the product, i.e., in a so-called wetted state when the product was used, was of 1,154 kcal/kg, which indicates that the product can be burnt up after being used.

The composition of the product comprised 85 parts by weight of a granular section, specifically, 11% by weight of the cotton-like pulp, 19% by weight of the highly water-absorptive resin and 55% by weight of the plastic material, and 15 parts by weight of a covering section, specifically, 10.5% by weight of the cotton-like pulp and 4.5% by weight of the highly water-absorptive resin.

In this example, the external material was used as a starting material for the animal excretion treating article, and portions of the cotton-like pulp and the highly water-absorptive resin recovered after the classification were used as a starting material for the covering material. 57.5% By weight of the cotton-like pulp and 12.5% by weight of the highly water-absorptive resin were recovered as regenerating products and put into reuse as the cotton-like pulp and the highly water-absorptive resin.

Grains of this product granulate were gathered and used as a sand for a cat toilet. In a room, a pseudo urine made by dissolving 10 g of table salt and 10 ml of aqueous ammonia into 1,000 ml of tap water was added to 50 g of the sand for the cat toilet in an area of 20 ml and a diameter of 20 mm, and a sand portion coagulated by the pseudo urine was removed. In the toilet sand in this example, the amount of a toilet sand portion coagulated by the pseudo urine was of 8.5 g.

Thus, the water absorptivity of the toilet sands in this example was 20/8.5 times, i.e., 2.4 times.

The sand for the cat toilet were laid at a thickness of 3 cm in a cat toilet and used. The cat used the sand as a toilet as usual, and as a result, there was no hindrance for use.

After the cat used the sand for excretion, that portion of the sand for cat toilet in which the cat excreted could be easily removed. Moreover, the sand for the cat toilet in this example had water-absorbing and deodorizing properties and hence, the generation of an uncomfortable odor in the room could be avoided.

EXAMPLE 4

This example is an example in which a paper diaper waste was treated by a wet classifying process.

The pulverized paper diaper waste having a particle size of 4 mm or less was treated by the wet classifying process and hence, the recovery rate of a cotton-like pulp was of about 80% or more, and the recovery rate of a highly water-absorptive resin was of about 99% or more.

In this example, a plastic material containing product resulting from the classification was used for a granular core section.

The plastic material product had a composition comprising 15% by weight of the cotton-like pulp, and 85% by weight of a so-called external material consisting of a plastic material, a rubber material and the like, and had a water content of 40 to 50% by weight.

In this example, the plastic material containing product was used for the granular core section. In this example, the highly water-absorptive resin was little contained in the plastic material product and hence, to smooth the extruding operation, 3% of the highly water-absorptive resin resulting from the classification was added.

The plastic material powder was mixed by sufficient agitation in a mixer to produce a granulating material mixture. This granulating material mixture was placed into the extruding zone of the granulating device and granulated by extrusion through a die having an opening of a diameter of 5.5 mm and a plate thickness of 25 mm, and properly chopping the extrudate by a chopper, thereby a granulate for forming a granular core section. The granulate was regulated in grain size in the grain-size regulating device and placed into a vibration disc-type covering device, where the covering material consisting of a mixture of 10.5 parts by weight of the pulverized cotton-like pulp having the particle size of 0.4 mm or less and 4.5 parts by weight of the highly water-absorptive resin having the particle size of 0.4 mm or less was scattered onto the surface of the granulate to cover the granulate. The covered granulate was loosened in the grain-size regulating machine and dried by the hot air drier. For the purpose of preventing the peeling-off, a diluted solution of polyethylene glycol, after the drying, was sprayed onto the surface of the covered granulate and dried again. The drying was carried out until the content of water in the covered granulate reached 11%. The obtained product was a granular material having a grain size of 10 to 5 mm. The calorific value of the granular material was of 6,120 kcal/kg as absolutely dried, and 5,377 kcal/kg as dried with the water content of 11%. The calorific value upon the absorption of 20 g of a pseudo urine into 8.5 g of the product, i.e., in a so-called wetted state when the product was used, was of 1,225kcal/kg, which indicates that the product can be burnt up after being used.

The composition of the product comprised 85 parts by weight of a granular section, specifically, 14% by weight of the cotton-like pulp, 3% by weight of the highly water-absorptive resin and 68% by weight of the plastic material, and 15 parts by weight of a covering section, specifically, 10.5% by weight of the cotton-like pulp and 4.5% by weight of the highly water-absorptive resin.

In this example, the external material was used as a starting material for the animal excretion treating article, and portions of the cotton-like pulp and the highly water-absorptive resin recovered after the classification were used as a starting material for the covering material. 74.5% By weight of the cotton-like pulp and 38% by weight of the highly water-absorptive resin were recovered as regenerating products and put into reuse as the cotton-like pulp and the highly water-absorptive resin. It was indicated that the recovery rate provided by the wet separation was higher than that provided by the dry separation.

Grains of this product granulate were gathered and used as a sand for a cat toilet. In a room, a pseudo urine made by dissolving 10 g of table salt and 10 ml of aqueous ammonia into 1,000 ml of tap water was added to 50 g of the sand for the cat toilet in an area of 20 ml and a diameter of 20 mm, and a sand portion coagulated by the pseudo urine was removed. In the toilet sand in this example, the amount of a toilet sand portion coagulated by the pseudo urine was of 9 g.

Thus, the water absorptivity of the toilet sands in this example was 20/9 times, i.e., 2.2 times.

The sand for the cat toilet were laid at a thickness of 3 cm in a cat toilet and used. The cat used the sand as a toilet as usual, and as a result, there was no hindrance for use.

After the cat used the sand for excretion, that portion of the sand for cat toilet in which the cat excreted could be easily removed. Moreover, the sand for the cat toilet in this example had water-absorbing and deodorizing properties and hence, the generation of an uncomfortable odor in the room could be avoided.

In the above-described examples, the waste of the paper diaper made using the highly water-absorptive resin was used, but when the waste of a paper diaper made using a water-absorptive resin other than the highly water-absorptive resin is used, a similar result is achieved.
Industrial Applicability The animal excretion treating article is produced by classifying the paper diaper waste powder having the particle size of 4 mm or less into the fraction consisting of the paper powder and the water-absorptive resin, and the fraction consisting of the plastic containing material; pulverizing the plastic containing material into the particle size of 2 mm or less; and granulating the resulting material to form a columnar or granular material. The fraction consisting of the paper powder and the water-absorptive resin is pulverized into the particle size of 0.4 mm or less, and is used as the covering material for covering the granulate formed into the columnar or granular shape. Therefore, as compared with the prior art animal excretion treating article, all of the starting material can be derived from the paper diaper waste powder, and thus, the animal excretion treating article can be produced at a low cost.

In addition, according to the present invention, the coloring due to the fine pulverization of the paper diaper waste powder can be eliminated by pulverizing the fraction consisting of the paper powder and the water-absorptive resin produced by the classification of the paper diaper waster powder, and covering the pulverized powder with the covering material, and the paper diaper waste powder can be effectively utilized.

In the present invention, the paper diaper waste powder used as the starting material is a waste having a high calorific value. The water-absorptive resin is contained in the paper diaper waste powder and hence, the paper diaper waste powder has a high water absorbing rate. For this reason, 1,000 to 2,500 kcal/kg required for the incineration of the common refuse cannot be maintained. However, according to the present invention, the paper diaper waste powder is classified into the fraction containing the plastic material and the fraction containing the paper powder and the water-absorptive resin and hence, the amount of the fraction containing the paper powder and the water-absorptive resin can be reduced relative to the plastic containing fraction to increase the calorific value after use of the animal excretion treating article to provide the calorific value of 1,000 to 2,500 kcal/kg required for the incineration of the animal excretion treating article wetted by the excretion after being used, thereby enabling the incineration of the article which has been conventionally difficult.

Therefore, the animal excretion treating article according to the present invention can be treated along with the common refuse unlike the conventional animal excretion treating article and easily incinerated as a burnable waste. Thus, it is easy to treat the waste as compared with the conventional excretion treating article.

Further, according to the present invention, the paper diaper waste powder is classified into the fraction containing the paper powder and the water-absorptive resin and the plastic material containing fraction, which fractions are used as the starting materials. Therefore, the amount of paper powder and water-absorptive resin used as the covering material is small as compared with the plastic containing fraction and hence, by increasing the amount of the paper powder in the covering material, the amount of water-absorptive resin used can be decreased. Thus, the relatively expensive highly water-absorptive resin can be previously recovered by the screening separation from the paper diaper waste powder . In addition, since the water-absorptive resin waste having a low water absorbing capability can be used in place of the highly water-absorptive resin and the inexpensive adhesive substance can be used, the manufacture cost of the animal excretion treating article can be reduced.

What is claimed is:

1. A animal excretion treating article comprising a granular core section, and a covering layer section which covers said core section, wherein said granular core section is formed of a granulate formed mainly from a plastic material power having a particle size of 4 mm or less, and said covering section is formed mainly of a mixture of a paper powder and a water-absorptive resin.

2. A animal excretion treating article according to claim 1, wherein said core section contains 20% by weight or more of the plastic material powder, and the remainder consisting of the paper powder and an amount of the water-absorptive resin smaller than that of the paper powder.

3. A animal excretion treating article according to claim 1, wherein said core section contains 30% by weight or more of the plastic material powder, and the remainder consisting of the paper powder and an amount of the water-absorptive resin smaller than that of the paper powder.

4. A animal excretion treating article according to claim 1, wherein said core section contains 50% by weight or more of the plastic material powder, and the remainder consisting of the paper powder and an amount of the water-absorptive resin smaller than that of the paper powder.

5. A animal excretion treating article according to claim 1, wherein said core section contains 70% by weight or more of the plastic material powder, and the remainder consisting of the paper powder and an amount of the water-absorptive resin smaller than that of the paper powder.

6. A animal excretion treating article according to claim 1, wherein said core section contains 90% by weight or more of the plastic material powder and the remainder consisting of the paper powder and an amount of the water-absorptive resin smaller than that of the paper powder.

7. A animal excretion treating article according to claim 1, wherein said core section contains 90% by weight or more of the plastic material powder, 8% by weight or more of the paper powder, and the remainder consisting of the water-absorptive resin.

8. A animal excretion treating article according to claim 1, wherein said core section contains the plastic material powder which is plastic waste powder derived from a paper diaper waste.

9. A animal excretion treating article according to claim 1, wherein said core section contains the plastic material powder which is plastic waste powder derived from a paper diaper waste, and the paper powder and the water-absorptive resin forming said covering section are derived from the paper diaper waste.

10. A animal excretion treating article according to claim 1, wherein the calorific value of the animal excretion treating article in a state in which it has absorbed water in an amount 1.8 times the unit weight, is of 800 kcal/kg or more.

11. A animal excretion treating article according to claim 1, wherein the calorific value of the animal excretion treating article in a state in which it has absorbed water in an amount 1.8 times the unit weight, is in a range of 1,000 to 2,500 kcal/kg.

12. A animal excretion treating article according to claim 1, wherein the calorific value of the animal excretion treating article in a state in which it has absorbed water in an amount 2 times the unit weight, is in a range of 1,200 to 2,500 kcal/kg or more.

13. A animal excretion treating article comprising a core section and a covering layer covering said core section, wherein said core section formed of a granulate formed from a mixture of a paper powder, a water-absorptive resin and a plastic waste powder, said mixture being derived from a paper diaper waster powder.

14. A process for producing an animal excretion treating article, comprising the steps of classifying a pulverized paper diaper into a fraction having a higher content of a paper powder and a water-absorptive resin, and a fraction having a higher content of a plastic material; pulverizing said fraction having the higher content of the plastic material into a particle size of 4 mm or less; extruding and granulating said pulverized fraction to form a granulate having a particle size of 3 mm or less; and covering said granulate with the fraction which has the higher content of the paper powder and/or the water-absorptive resin and which is a pulverized material having a particle size of 1 mm or less.

15. A process for producing an animal excretion treating article according to claim 14, wherein the classification of the pulverized paper diaper is carried out under a classifying condition where the paper powder and the water-absorptive resin are obtained within a range of 15 to 30% by weight.

16. A process for producing an animal excretion treating article according to claim 14, wherein the classification of the pulverized paper diaper is carried out in a dry manner.

17. A process for producing an animal excretion treating article according to claim 14, wherein the classification of the pulverized paper diaper is carried out in a dry manner, so that the paper powder and the water-absorptive resin are obtained within a range of 15 to 30% by weight.

18. A process for producing an animal excretion treating article according to claim 14, wherein the classification of the pulverized paper diaper is carried out in a wet manner.

19. A process for producing an animal excretion treating article according to claim 14, wherein the classification of the pulverized paper diaper is carried out in a wet manner, so that the paper powder and the water-absorptive resin are obtained within a range of 15 to 30% by weight.

* * * * *